J. RARICK.
AUTOMATIC HOUSEHOLD FILTER.
APPLICATION FILED MAR. 31, 1910.
984,705.
Patented Feb. 21, 1911.
2 SHEETS—SHEET 1.
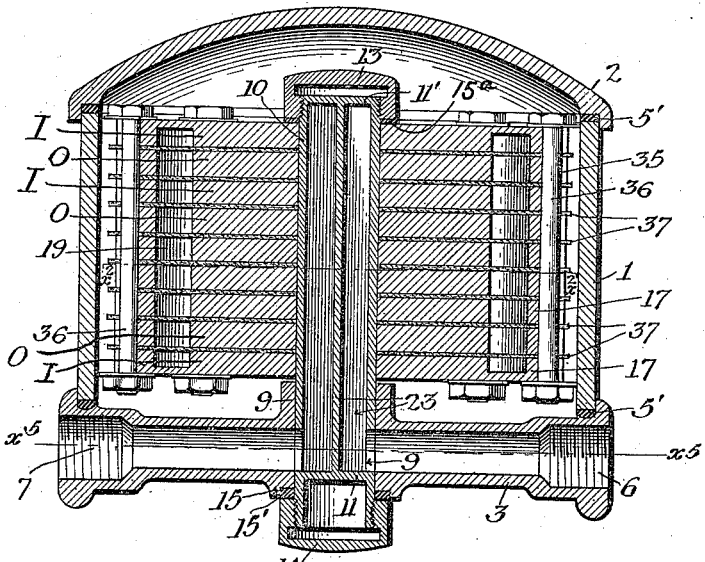
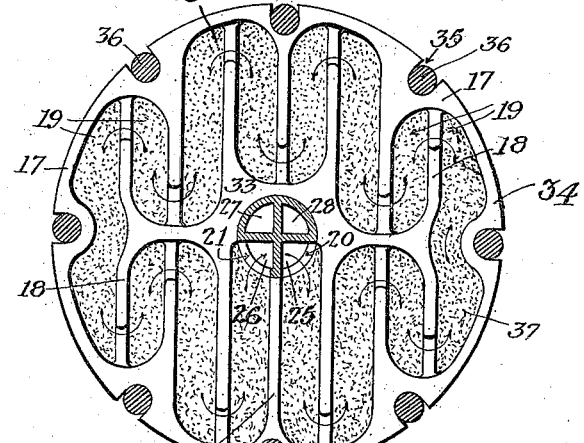
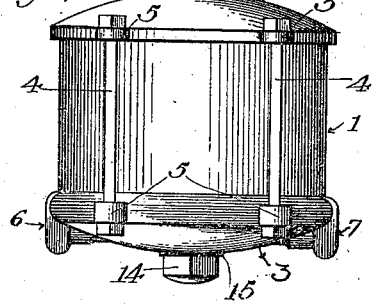
Witnesses:
Inventor:
John Rarick

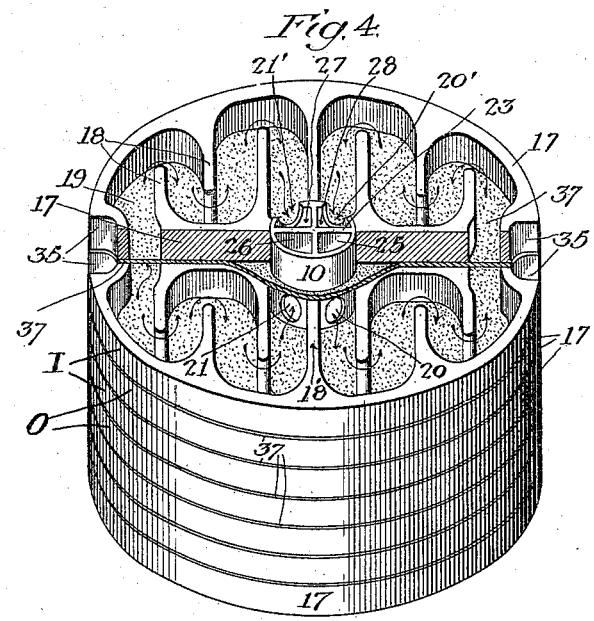
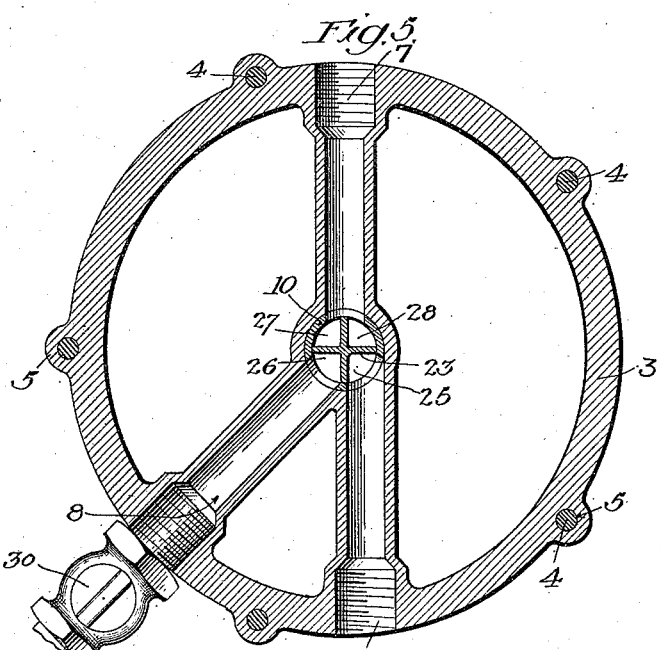

UNITED STATES PATENT OFFICE.

JOHN RARICK, OF UPLAND, CALIFORNIA.

AUTOMATIC HOUSEHOLD-FILTER.

984,705. Specification of Letters Patent. Patented Feb. 21, 1911.

Application filed March 31, 1910. Serial No. 552,716.

*To all whom it may concern:*

Be it known that I, JOHN RARICK, a citizen of the United States, residing at Upland, in the county of San Bernardino and State of California, have invented a new and useful Automatic Household - Filter, (Case B,) of which the following is a specification.

The main object of the present invention is to provide a household filter of large capacity and of simple and cheap construction.

Another object of the invention is to provide a household filter of this character in which the several parts are readily removable for inspection, cleaning and repair.

A further object of this invention is to provide for flushing out such a filter from time to time as required.

Other objects of the invention will appear hereinafter.

The accompanying drawings illustrate the invention, and referring thereto:—Figure 1 is a vertical section of the filter. Fig. 2 is a horizontal section on the line $x^2$—$x^2$ in Fig. 1. Fig. 3 is a side elevation of the filter. Fig. 4 is a perspective of the stack of filter elements, partly broken away, to show the interior construction. Fig. 5 is a horizontal section on the line $x^5$—$x^5$ in Fig. 1.

The filter comprises a cylindrical shell 1 having a top 2 and bottom 3 which are clamped together by bolts 4 which pass through eyes 5 on the top and bottom members. Packing rings 5' are provided between the top and bottom members and the cylindrical shell to give a tight joint. The bottom member, as clearly shown in Figs. 1 and 5, is formed with a water inlet passage 6, a regular water outlet passage 7, and a flushing outlet passage 8, (see Fig. 5). Extending vertically in the center of the filter is a tube 10 which is constructed with a plurality of longitudinal passages in the interior thereof. In the present drawings I have shown four of such passages 25, 26, 27 and 28. The passage 25 communicates with the water inlet passage 6, as shown in Fig. 5; the passage 26 communicates with the flushing outlet passage 8, while passages 27 and 28 communicate with the regular outlet 7, the two passages 27 and 28 constituting in the present case virtually a single conduit. The lower end of the tube 10 is closed by a plate 11, while the upper end of the tube 10 is closed by a plate 11'. Caps 13 and 14 are screwed to the upper and lower ends of the tube, respectively, and a gasket 15' is seated in a recess 15 formed in the bottom 3 and closes the joint between the cap 14 and the bottom 3 and lower end of the tube 10, while a gasket 15ª is seated between the lower end of the cap 13 and the upper filter member which will be described.

A series of filter elements are arranged within the shell 1, and the tube 10 extends centrally up through the series of filter elements, as clearly shown in Fig. 1. Each filter element comprises a grid 17 which is formed with ribs 18. The ribs 18 form a continuous tortuous channel 19 in each grid. The tortuous channel 19 has a general direction circumferentially of the grid, the two ends of the channel being separated from each other by a rib 18', as clearly shown in Fig. 2. One end of the channel 19 communicates with an opening 20 in the tube 10 communicating with the passage 25, and from the opening 20 the passage 19 may be traced counter-clockwise in Fig. 2 circumferentially around the grid to the opposite side of the rib 18' and at that end in communication with an opening 21 in the tube 10 which communicates with vertical passage 26. It should be noted, however, that only the passage 19 in alternate grids communicates with openings 25 and 26. Passages 19 of the intervening grids communicate with passages 27 and 28, as indicated in Fig. 4, an opening 21' placing one end of the passage 19 in communication with vertical passage 27, and an opening 20' placing the other end of passage 19 into communication with vertical passage 28. The alternate grids I, see Figs. 1 and 4, communicate through the openings 20 and 21 with the vertical passages 25 and 26, while the intervening grids O communicate through openings 20' and 21' with vertical passages 27 and 28. Between the grids O and I are filtering plates 37 formed of any suitable material, such as chamois.

In operation, water enters through the inlet passage 6 and passes to the vertical passage 25, as shown in Fig. 5. Water after having entered the vertical passage 25 passes laterally through the openings 20 into the respective channels 19 which are formed in the grids I and the water in each channel 19 traverses its tortuous circuit, as heretofore described in connection with Fig. 2, until the said passage is filled. At this time, that is during the regular filtering operation, the water does not flow through opening 21 and out through passage 26 and flushing outlet 8, because valve 30 is closed. As soon, therefore, as passages 19 in the respective grids I are completely filled with water, the water then commences to percolate in both directions through the adjacent filter plates 37, water working down through that filter plate 37 which is below the grid I and water also percolating upward through that filter plate 37 which lies directly above the grid I. Thus water passes from the respective grids I both upwardly and downwardly through the adjacent filter plates 37 into the passages 19 in the intervening grids O and fills the passages 19 in the grids O and then through the passages 20' and 21' enters the vertical passages 27 and 28, see Fig. 4, and flowing to the bottom of the passages 27 and 28 enters the outlet passage 7 and is discharged from the filter.

When it is desired to clean the filter, the valve 30 is opened, whereupon water circulation is established from the passages 19 of the grids I, through the opening 21 into the vertical passage 26, thence out through the flushing outlet passage 8 and a high velocity of the water is maintained, circulation now being traced as follows: from inlet passage 6 into vertical passage 25, through opening 20 into passages 19 of grids I, thence through openings 21 into vertical passage 26, thence to the bottom of vertical passage 26 and out through flushing outlet 8. The water in making this circuit moves with great rapidity and clears out all of the passages, thoroughly flushing and cleaning the filter. At the same time it should be noted that the filtering operation is not interfered with as water is still free to percolate through the adjacent filter plates 37, as heretofore described.

What I claim is:—

1. A filter comprising a stack of superposed grids, each formed with a channel and with intervening ribs, filtering means clamped between said grids, a member extending centrally through said grids and having vertical passages provided with a water supply connection and with a series of openings communicating with the channels in alternate grids, at one end of said channels, said centrally extending member having a vertical passage provided with a flushing outlet connection and provided with a series of openings communicating with the aforesaid alternate channels at the other ends thereof, and said centrally extending member being provided with a vertically extending passage having an outlet connection for filtered water and provided with a series of openings communicating with the channels in the grids intermediate the said alternate grids.

2. A filter comprising a stack of grids, each formed with a tortuous channel and with intervening ribs and a peripheral wall, a filter means between said grids, means clamping the aforesaid parts together, a member extending within said stack of grids and provided with a plurality of passages, a water supply connection to one of said passages, a flushing outlet connected to another of said passages, and a filtered water outlet connected to another of said passages.

3. A filter comprising a casing provided with an inlet for water, an outlet for filtered water, and an outlet for flushing, in its bottom, a tubular member extending upwardly from the bottom of said casing and provided with passages communicating with said inlet and flushing outlet, two passages communicating with the filtered water outlet, said two passages being arranged on opposite sides of the tubular member from the aforesaid passages, a series of superposed filter elements surrounding and supported on said tubular member and provided with internal channels, the said channels on alternate filtering members communicating at opposite ends respectively with the inlet and flushing outlet passages in the tubular member, and the channels in the intervening grids communicating with the filtered water outlet passages in the tubular member, filtering means interposed between adjacent filter elements, and means for clamping the said grids and filtering means in position on the tubular member.

4. The combination of two superposed filter members, each formed with a tortuous channel and an intervening rib, a porous partition plate between said filter members, and a central member extending within the filter members and provided with a water inlet passage communicating with one end of the channel in one of said members, with a flushing outlet passage communicating with the other end of said channel, and with a filtered water outlet passage communicating with the channel in the other filter member.

5. The combination of a stack of superposed filter members, formed as grids with tortuous channels and intervening ribs, flexible porous filtering means between said grids, clamping means holding the filter members in contact with the flexible filter means, and a member extending centrally through the stack of filter members engaging and supporting said stack of filter members and provided with inlet passages communicating with the channels in alternate grids, with a flushing outlet passage communicating with said channels, and with a filtered water outlet passage communicating with the channels in the grids intermediate the said alternate grids.

In testimony whereof, I have hereunto set my hand at Los Angeles California this 24th day of March 1910.

JOHN RARICK.

In presence of—
ARTHUR P. KNIGHT,
FRANK L. A. GRAHAM.